United States Patent [19]
Satoh et al.

[11] Patent Number: 4,736,352
[45] Date of Patent: Apr. 5, 1988

[54] OPTICAL RECORDING MEDIUM AND APPARATUS FOR RECORDING AND REPRODUCING DATA THEREIN

[75] Inventors: Isao Satoh, Neyagawa; Tamotsu Matsuo, Osaka, both of Japan

[73] Assignee: Matsushita Electric Industrial Co., Ltd., Kadoma, Japan

[21] Appl. No.: 664,868

[22] Filed: Oct. 25, 1984

[30] Foreign Application Priority Data
Nov. 25, 1983 [JP] Japan ................................ 58-222407
Nov. 26, 1983 [JP] Japan ................................ 58-222501

[51] Int. Cl.⁴ .......................... G11B 21/08; G11B 7/24
[52] U.S. Cl. ...................................... 369/32; 369/275; 369/59
[58] Field of Search ....................... 369/32, 33, 41, 43, 369/44, 47, 53, 58, 54, 275, 56, 57, 59, 98; 358/342, 907; 360/78, 48, 38.1

[56] References Cited

U.S. PATENT DOCUMENTS

| | | | |
|---|---|---|---|
| 4,022,986 | 5/1977 | Teer et al. | 369/44 |
| 4,535,439 | 8/1985 | Satoh et al. | 369/44 |
| 4,539,664 | 9/1985 | Deguchi et al. | 369/44 |
| 4,545,044 | 10/1985 | Satoh et al. | 369/32 |
| 4,546,462 | 10/1985 | Koishi et al. | 369/53 |
| 4,555,736 | 11/1985 | Mathieu et al. | 358/342 |

FOREIGN PATENT DOCUMENTS

| | | | |
|---|---|---|---|
| 0054438 | 6/1982 | European Pat. Off. | 369/275 |
| 58-114359 | 7/1983 | Japan | 369/44 |
| 58-155549 | 9/1983 | Japan | 369/275 |
| 58-177537 | 10/1983 | Japan | 369/33 |
| 2038058 | 7/1980 | United Kingdom | 369/32 |

*Primary Examiner*—Raymond F. Cardillo
*Assistant Examiner*—Steven R. Garland
*Attorney, Agent, or Firm*—Wenderoth, Lind & Ponack

[57] ABSTRACT

An optical disk for optical recording and reproducing data has a spiral track and further includes a single index field and a plurality of sectors. The index field includes an index mark that indicates the position at which an optical head of the optical recording and reproducing apparatus retraces a spiral track by jumping a specific portion of the guide track. Each of the sectors has a sector header, which comprises a sector mark located at the start of the sector and an address field including a track address, sector address, and an error detecting and correcting code. The index mark in the field is detected, and the optical head is made to perform a jumping operation in response to the resulting signal, whereby the jumping operation is rendered certain. When there is a failure to read the address fields, the signal produced by detecting the index mark starts a counter which counts the signal produced by detecting a sector mark, for recovering the sector address.

6 Claims, 4 Drawing Sheets

OPTICAL RECORDING MEDIUM AND APPARATUS FOR RECORDING AND REPRODUCING DATA THEREIN

BACKGROUND OF THE INVENTION

The present invention relates to an optical recording medium for recording and reading information by the use of a light beam such as a laser beam and, more particularly, to the format of such guide track on an optical recording medium that takes a spiral form.

An optical recording medium such as an optical disk is able to record information using a laser beam which is emitted by an optical head and which is focused to a spot of the order of 1 μm in diameter. The information can be read by a read/write head that is placed in non-contacting relation to the disk. Accordingly, it has attracted interest for high-density, digital mass storage.

A guide track in the form of a groove has been previously formed on an optical disk, and the neighboring turns, of this track are spaced apart a distance on the order of microns. A layer to be recorded is pierced or the reflectivity of the layer is changed by the energy of a laser beam having a minute diameter while the guide track is being traced by the thin laser beam, in order to record information.

Optical disks for recording digital data have a guide track which is divided into a plurality of sectors in accordance with a certain format, like magnetic disks. Thus, a user can select a desired one of the sectors at will to record and read information. This format is formed at the same time when the guide track is cut by a laser cutting machine on a master disk coated with photoresist. The obtained master disk is subjected to development, and then it is plated with nickel. The plating layer of nickel is peeled off from the body of the master disk to provide a master disk of nickel on which the images that were formed on the photoresist layer by laser cutting have been transferred. This master disk of nickel is then set in a plastic mold, into which a plastic material is injected to form a replica disk that stores information formatted as described above. A recording material is then deposited onto the replica disk to form a recording layer. Subsequently, a protective layer is formed on this recording layer, thus completing the optical disk.

One example of this format of the optical, disk is disclosed in U.S. Pat. Ser. No. 444,456 now U.S. Pat. No. 4,535,439, entitled "Optical Having Index Mark and Sector Mark", filed Nov. 24, 1982, in which the disk is divided into a plurality of sectors equally spaced apart from each other. The sectors are provided with a sector separator of identical structure at their foremost positions. Address parts which store addresses for the turns of the track are formed in the specific portion of the disk,i.e., the region extending radially from the center of rotation of the disk. Those which are cut in the innermost region of the disk are first and second index parts corresponding to the address parts and the sector separators, respectively. The first and second index parts are detected as changes in the quantity of reflected light by specially installed index detecting devices. The first index parts are used to determine the timing at which the light beam jumps back to its starting point after completing one trace of a specific portion of the spiral guide track, for retracing purposes. The second index parts are counted by a counter which delivers an output signal to indicate sector addresses for the sectors on the optical disk. The sector separators and the first and second index parts are shaped into depressions according to signals in the form of a burst.

The format as described thus far has the following features. Since the optical head is caused to jump in response to the detection of one first index part, it is hardly affected by drop-out occurring on the optical disk. This ensures that the head is made to jump with certainty. Further, the sector addresses are read at a low error rate. However, special devices are needed to detect the first and second index parts. In addition, it is difficult to correctly adjust the positions of these detecting devices relative to the read/write head. If some sector separators cannot be detected, the corresponding sector addresses will be judged to be absent.

SUMMARY OF THE INVENTION

Accordingly, it is an object of the present invention to provide an optical recording medium which is so formatted that it permits an optical head to stably jump without requiring the aforementioned index parts or special index-detecting devices on or over the medium such as an optical disk, and which allows the positions of sectors to be sensed with certainty even if addresses are read incorrectly.

It is another object of the invention to provide an optical recording and reading apparatus which is used with the optical recording medium as described just above and which assures both stable jumping operation and certain reading of sector addresses.

These and other objects of the invention are accomplished by an optical recording medium having a spiral guide track and including an index field and a plurality of sectors. The index field consists of a first discrimination portion and a jumping region that follows the discrimination portion. The first discrimination portion gives the timing at which an optical head is caused to jump from one location of the track to another. Each of the sectors consists of a second discrimination portion located at the head of the sector, a sector header region that follows the second discrimination portion and is formed by an address field, and a data field for storing data.

When the first discrimination portion is detected, a signal for initiating a jumping operation is generated. The jumping operation is performed to trace any arbitrary turn of the spiral track. This signal (hereinafter referred to as "the first discrimination signal") is also used to start the rotation of the medium.

A second discrimination signal that is produced by detecting each second discrimination portion cooperates with the first discrimination signal to recover errors produced in reading sector addresses held in the address fields. Specifically, when such an error occurs, the signal indicating the corresponding sector address is replaced by a substitute address signal which is formed by counting the second discrimination signal. This counting is initialized by the first discrimination signal.

The present invention also provides an optical recording and reading apparatus which is used with the aforementioned optical recording medium and which comprises: a means for separating the first and second discrimination signals; a means for performing a jumping operation over said jumping region in response to the first discrimination signal separated by the separating means; a means for checking for errors in reading the addresses held in address fields; a counter that begins to count the second discrimination signal upon application of the first discrimination signal in response to the output signal from the checking means that indicates a read error when this error is detected; and a means for replacing the output from the counter by the signal produced by reading the sector address held in the address field; the apparatus combining the function of stable and reliable track jumping with the function of recovering errors produced in reading sector addresses. The novel optical recording and reading apparatus as described above yields the following advantages:

(1) It is possible to repeatedly trace any arbitrary turn of the spiral guide track without the need to use special detectors.

(2) Even if some sector addresses held in address fields are incorrectly read, the signals indicating these sector addresses are replaced by the output from the counter to which the first and second discrimination signals are applied in cooperative relation, thus reducing the rate of sector addresses not detected.

(3) The optical reading and reading apparatus that is used with the novel optical recording medium detects the first discrimination portion on the medium and causes an optical head to perform a jumping operation over the jumping region in response to the resulting signal without using special detectors, thereby permitting the head to repeatedly trace any arbitrary turn of the spiral track. If some sector addresses held in address fields are incorrectly read, a substitutive address signal is produced utilizing the first and second discrimination signals to use it in place of the signal indicating the sector addresses, thereby reducing the rate of sectors not detected. This increases the efficiency of utilization of sectors. For identical rate of sectors not detected, the novel optical recording medium can be manufactured with a high yield.

While the novel features of the invention are set forth with particularity in the appended claims, the invention, both as to organization and contents, will be better understood and appreciated, along with other objects and features thereof, from the following detailed description taken in conjunction with the accompanying drawings.

DESCRIPTION OF THE PREFERRED EMBODIMENTS

Figure 1:
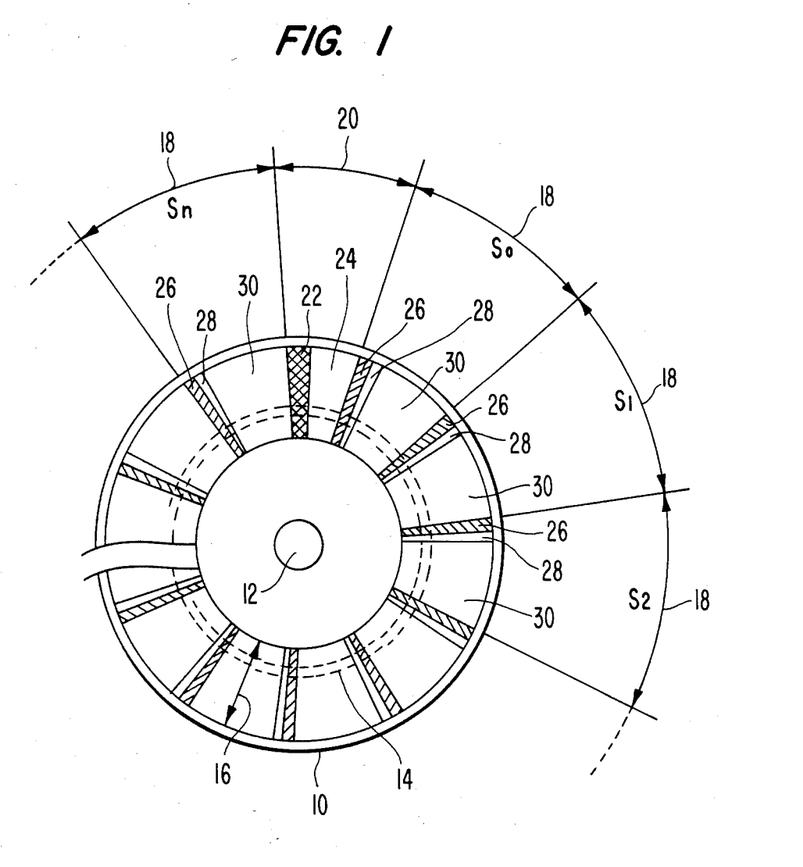
FIG. 1 is a plan view of an optical recording medium such as an optical disk according to the present invention, for showing the data format of the track.

Referring to FIG. 1, there is shown an optical disk 10 that is an example of optical recording medium. The disk 10 is provided with a hole 12 at its center, and is rotatable about this hole. A guide track 14 that is shaped into a spiral groove is formed in a region 16 on the disk 10. As an example, the track 14 has a width of 0.7 $\mu$m and a depth of one-eighth to one-fifth of the wavelength used. The pitch, i.e., the distance between the successive turns of the track, is 1.6 to 2 $\mu$m.

The optical disk 10 has a plurality of (32 in the present example) sectors ($S_0$-$S_n$) 18 for storing visual or aural information as derived from a television signal and an index field 20 that does not contain such information. The index field 20 is used either as the starting point for the disk 10 or for jumping purposes as described below. Where visual information is recorded on the optical disk, for example, if a user wants to see a still, or motionless, picture for some time, one specific turn of the spiral guide track 14 is required to be traced repeatedly. To perform this operation, the light beam that traces the track 14 must be caused to move out of the track, i.e., to jump once from some location on the track, because the track 14 is spiral, and then the beam must be returned to the starting point of that one revolution of trace. This operation will hereinafter be referred to "jumping". There is an index mark 22, which will be described in detail later, at the head of the index field 20, i.e. the part of the field which first passes the optical head. This mark 22 is followed by a jumping region 24 (G1 in FIG. 2). The light beam is caused to jump when the beam is moving across this jumping region 24.

The sectors 18 have the same format. Specifically, the front portion of each sector 18 has a sector mark (SM) 26, which is followed by an address field (one of $A_0$-$A_n$) 28. Following the address field 28 comes a data field (one of $D_0$-$D_n$) 30 for storing visual or aural information. Each sector mark 26 indicates the beginning of the sector. If the sector address cannot be read in the succeeding address field, this sector mark is used to recover the sector address. Each address field 28 contains a track address and a sector address which are read through the use of the light beam to accurately sense the position of the light beam.

As described previously, the index mark (IDM) 22 in the index field 20 is used to generate a trigger signal which causes the light beam to return to its starting point after the beam traces one turn of the spiral guide track 14 on the disk 10. This trigger signal is detected by an optical head that reads or writes on the optical disk. The output signal from this head drives an actuator to slightly move a focusing lens incorporated in the optical head radially of the disk so that the light beam from the light head will move out of the track within the jumping region 24 and return to the previous turn of the track. After completing the jumping operation, the address field $A_0$ in the sector $S_0$ that lies next to the jumping region 24 will be read. If this address field $A_0$ should not be read, then the address field $A_1$ in the following sector $S_1$ will be read If the field $A_1$ should not be read, the address field $A_2$ in the further next sector $S_2$ will be read, and so on. The result of the reading is employed to check that the jumping operation has been correctly carried out. This ensures that the spiral guide track is retraced reliably.

As already described, each turn of the track on the optical disk 10 is divided into (n+1) sectors. Each sector is selected using the track address and the sector address which together constitutes the address field 28, in order that data be written into, or read from, a desired sector. Visual or aural information is stored in the data field 30 of each sector 18.

Figure 2:
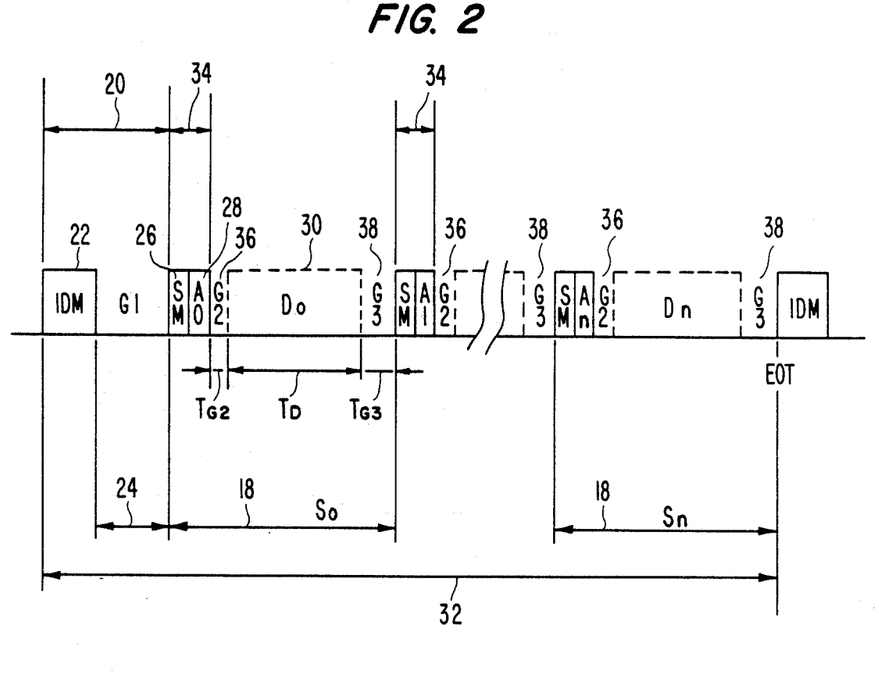
FIG. 2 is a diagram showing the data format of the track on the medium of FIG. 1.

The data format of the track on the optical disk 10 is next described by referring to FIG. 2. In FIG. 2, the same components as those in FIG. 1 are indicated by the same reference numerals as in FIG. 1 and will not be described hereinafter. The period of one revolution of the disk 10 is indicated by numeral 32. Each sector 18 includes a sector header region 34 which consists of the sector mark 26 and the address field 28. The end of each turn of the track is indicated by EOT.

Each data field 30 has a gap (G2) 36 at its front end and another gap (G3) 38 at its rear end. No data is recorded in the gaps 36 and 38. These gaps are determined by the factors: (1) variations in the rotational frequency of an electric motor that rotates the disk; (2) the eccentricity of the disk; (3) external vibration or shock; (4) the rise time or fall time of the envelope of the output light emitted by the laser; and (5) the interval between the erasing light beam from an erase head and the writing or reading beam. The factors (1)–(3) described above result in changes in the velocity of the light beam relative to the disk. The factors (4) and (5) give rise to a value $T_O$ intrinsic to the apparatus.

If we assume that the change in the relative velocity of the beam, its normal velocity, and the length of the data fields 30 are equal to $\pm \Delta V$, $V_O$, and $T_D$, respectively, then the length of the data fields 30 changes by $\pm (\Delta V/V_O) \cdot T_D$. Then, we can have the following relationships:

$$T_{G3} > (\Delta V/V_O) \cdot T_D + T_O$$

$$T_{G2} > (\Delta V/V_O) \cdot T_{G2} + T_O \approx T_O$$

where $T_{G2}$ and $T_{G3}$ are the lengths of the gaps 36 and 38, respectively. Generally, since $T_D \gg T_{G2}$, $T_{G3} \gg T_{G2}$.

As an example, the interval in the factor (5) is 5 μsec, and the rise or fall time in the factor (4) is 10 μsec. Then, $T_O = 15$ μsec. The variations in the factor (1) are equal to 0.1%. The eccentricity ratio in the factor (2) is 0.4% when the eccentricity is 100 μm and the radius is 25 mm. With respect to the factor (3), it is assumed that if the disk is subjected to a shock of 1 g (gravitational constant), the value is 1%. Then, $(\Delta V/V_O) = 1.5\%$. If $T_D = 2$ msec, $T_{G3} > 45$ μsec, and $T_{G2} > 15$ μsec. Hence, the gaps (G3) 38 are required to be longer than the gaps (G2) 36 by a factor of three or more.

Figure 3:
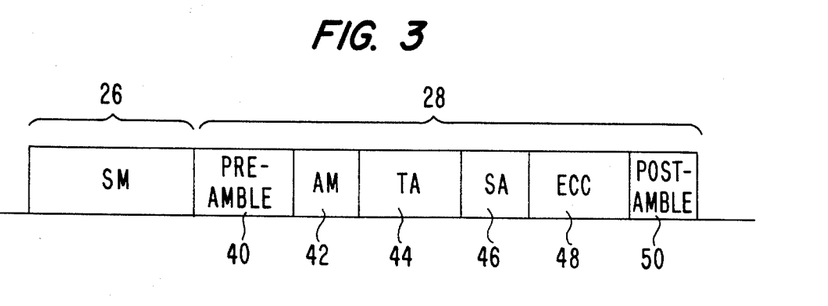
FIG. 3 is a diagram specifically showing one example of address field on the medium shown in FIG. 1.

The structure of each address field 28 is next described by referring to FIG. 3, where the address field 28 consists of a preamble 40, an address mark (AM) 42, a track address (TA) 44, a sector address (SA) 46, an error detecting and correcting code (ECC) 48, and a postamble 50. The preamble 40 puts the address field 28 into synchronism with the incoming clock pulses when the address field is read, and permits stable reading of the succeeding portions of the address field. The address mark (AM) 42 indicates the beginning of the address portion, which is composed of one track address (TA) 44 given to that turn of the guide track and one sector address (SA) 46 given to that sector. The track address 44 indicates the address number given to that turn of the track, while the sector address 46 indicates the sector number given to that sector. The error detecting and correcting code 48 is used to see if the track address 44 and the sector address 46 were read correctly. If an error occurs, a correction is made. The postamble 50 assures that these portions of the address field are stably and completely read.

As well known in the art, the optical disk produces a bit error rate of the order of $10^{-4}$ to $10^{-5}$. The bit error rate of the address field 28 is worse than that ($10^{-3}$ to $10^{-4}$) of the optical disk by a factor of ten or more and, therefore, an error recovery function is necessitated. Since the address field 28 holds a long item of data, i.e., tens of bits, it is not readily affected by a burst error, and it cannot be interleaved. The optical disk produces burst errors ranging from tens of microns to hundreds of microns (corresponding to the range from tens of bits to hundreds of bits) relatively frequently. For these and other reasons, it is difficult to appropriately correct errors.

The device according to the present invention produces a substitutive sector address using the sector mark 26 recorded in the front part of the address field 28 of each sector header region 34 and uses the substitutive sector address in place of an address erroneously read from the address field, in order to recover the error. Thus, sector addresses are read quite reliably. The substitutive sector address is delivered from a counter which is initialized, i.e., cleared, by the signal produced by detecting the index mark 22. The signal generated by detecting the sector mark 26 is clocked into this counter. This operation for replacing the sector address is performed using a flip-flop circuit by switching from the output produced upon reading of the address field 28 to the output from the counter, or vice versa. The flip flop circuit is designed to be set by the signal generated in response to the detection of an incorrect reading of an address and reset by the signal produced in response to the detection of a sector mark. If errors have occurred in reading the address field 28 and the sector mark 26, or if both of them cannot be detected, then the sector address will unable to be detected, although such a situation quite rarely takes place. The track has a plurality of sectors which include the same track address, so at least one of the track addresses 44 will be read correctly. This creates no problems, because there is no possibility that the address fields 28 of the sectors are all incorrectly read. Two specific examples of each structure of the index mark 22 and the sector mark 26 are next described with reference to FIG. 4.

Figure 4A:
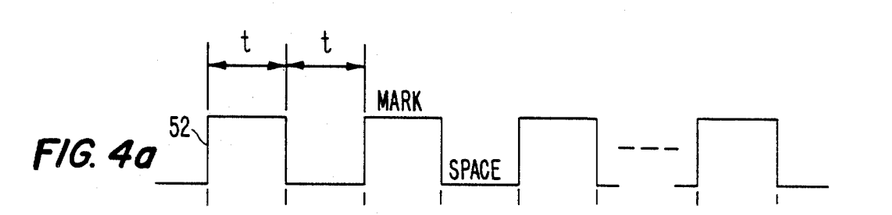
FIGS. 4a-4c are diagrams showing examples of an index mark and a sector mark both of which are formed on the medium shown in FIG. 1.
Figure 4B:
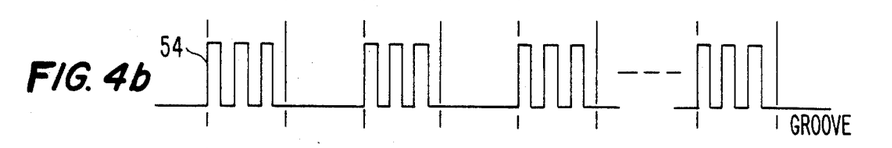
Figure 4C:
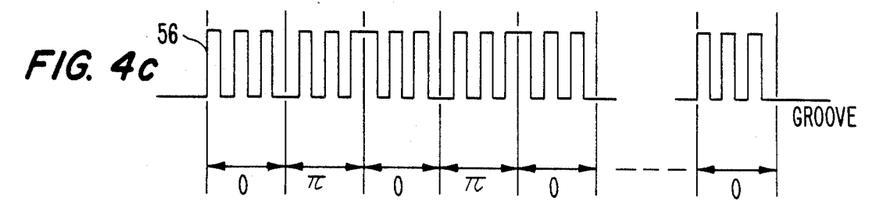

Referring to FIG. 4, there are shown pulses 52 which constitute the index mark 22 and the sector marks 26 and which are yet to be subjected to a modulation. Shown as a first example of the index mark 22 and the sector marks 26 is an RF pulse-gated signal 54. Shown as a second example of them is a signal 56 which has been subjected to phase modulation. Specifically, the signals 54 and 56 are waveforms recorded on the optical disk 10. These waveforms are detected by an optical head and demodulated to regenerate the pulses 52.

The RF pulse-gated signal 54 is obtained by gating the higher level. The remaining higher level portions are recorded as marks and the lower level portions are recorded as grooves. The lower level portions are so formed as to permit the minute light beam to be correctly detected when it crosses the track during the examination of the track.

The phase-modulated signal 56 is an RF signal, which is a signal having the high level (mark) and a low level (space) of pulse signal 52 phase-modulated in phase O and phase $\pi$, respectively. For example, the phase-modulated signal 56 that provides the second example is passed through a band-pass filter to form a continuous signal of a single frequency. As a result, the index mark 22 and the sector marks 26 are extracted without being materially affected by the signals derived from the data fields. The single frequency of the continuous signal makes it easy to reproduce the signals derived from the data fields using clock pulses if said single frequency is set equal to a submultiple of the frequency of the clock pulses.

Figure 5A:
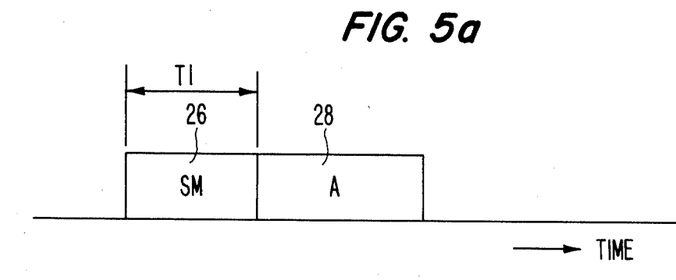
FIGS. 5a and 5b are diagrams showing the time relation between the index mark and the sector mark.
Figure 5B:
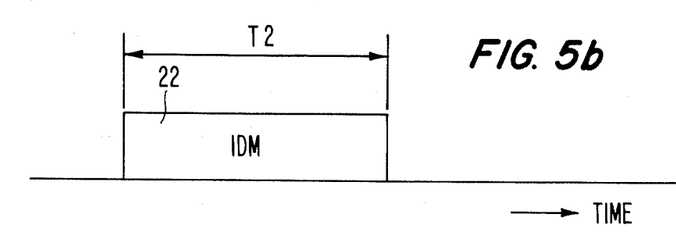

The time relation between the index mark 22 and the sector marks 26 is now illustrated by referring to FIGS. 5a and 5b. As indicated by the signal 54 or 56 of FIG. 4, these marks 22 and 26 have the same fine structure, and they can be distinguished from each other only by their lengths.

The length $T_2$ of the index mark 22 is made longer than the length $T_1$ of the sector marks 26, taking into account the efficiency of the format. To facilitate distinguishing between them, $T_2$ is made twice or thrice as long as $T_1$, for instance. The width t of the higher level portions (marks) and the lower level portions (spaces) is so selected that drop-outs of several microns encountered often with optical disks can be accommodated. Also, since the pulses 52 can be sufficiently accurately detected even if several marks are missing, drop outs of tens of microns can be allowed.

Figure 6:
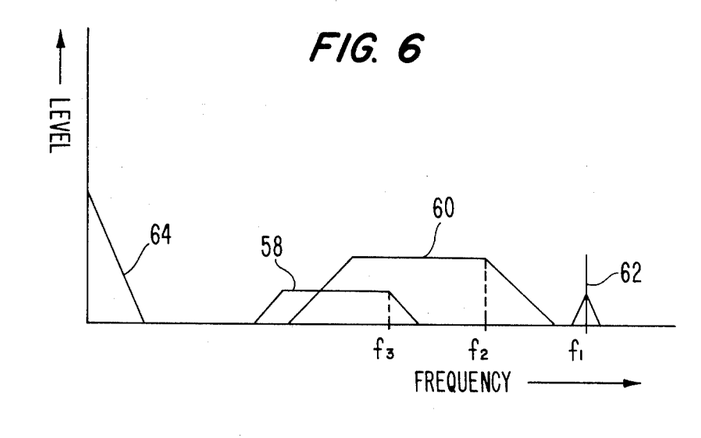
FIG. 6 is a diagram showing the frequency bands occupied by various signals generated in accordance with the data format of the track on the medium shown in FIG. 1.

As an example, typical optical disks frequently have drop outs of 10 to 100 μm and so the index mark 22 and the sector marks 26 are designed as follows. Suppose that an optical disk has a radius of 25 mm and that it rotates at 1,200 rpm. As described later in connection with FIG. 6, in order to accurately read the marks shown in FIG. 4, the relation $$t = 5.5/f_1 = 3.14 \ \mu sec$$

must be established, provided that the frequency $f_1$ of the RF-gated signal is 1.75 MHz and that the period of time t is longer than $f_1$ by a factor of six. The period t corresponds to a drop-out of about 9 μm. Since the maximum drop-out on the optical disk is assumed to be 100 μm, each sector mark 26 should be at least twice as long as that length. Then, let us assume that the number of pulses included in each mark is twelve ($T_1 = 75.4$ μsec). As the index mark 22 is required to be detected with greater accuracy than the sector marks 26, the number of pulses included in the index mark 22 is set to 36, i.e., three times as many as the pulses included in each sector mark 26 ($T_2 = 226.1$ μsec). Thus, about three times as many drop-outs can be tolerated for the index mark 22 as those allowed for the sector marks 26.

The frequency bands occupied by the signals involved in the data format of the track shown in FIG. 2 are now described with reference to FIG. 6, where the signals produced by reading one address field 28, one data field 30, and the index mark 22 or one sector mark 26 are shown as an address signal 58, a data signal 60, and an index mark signal or a sector mark signal 62, respectively. Indicated by numeral 64 is a signal used for a servo control, such as a tracking error signal or focus error signal. The clock frequency $f_c$ for the data signal, the gate frequency or the modulation frequency $f_1$ of the index mark or the sector mark signal 62, the highest fundamental frequency $f_2$ of the data signal 60, and the highest fundamental frequency $f_3$ of the address signal 58 are selected to satisfy the relations:

$$f_c = m_1 f_1 = m_2 f_2 = m_3 f_3$$

where $m_1$, $m_2$, and $m_3$ are integers. For example, for the optical disk which has a radius of 25 mm and rotates at 1,200 rmp, $f_c = 7$ MHz, $f_1 = 1.75$ MHz ($m_1 = 4$), $f_2 = 1.75$ MHz ($m_2 = 4$), and $f_3 = 0.875$ MHz ($m_3 = 8$). In this way, the frequency of the clock pulses for the data field is a submultiple of the frequency of the clock pulses for the address fields, thus facilitating the reading of the data fields in synchronism with the clock pulses. Although the data signal 60 and the address signal 58 are shown to occupy different frequency bands in FIG. 6, it is obvious that both can occupy the same frequency band and can be modulated in the same way.

Figure 7:
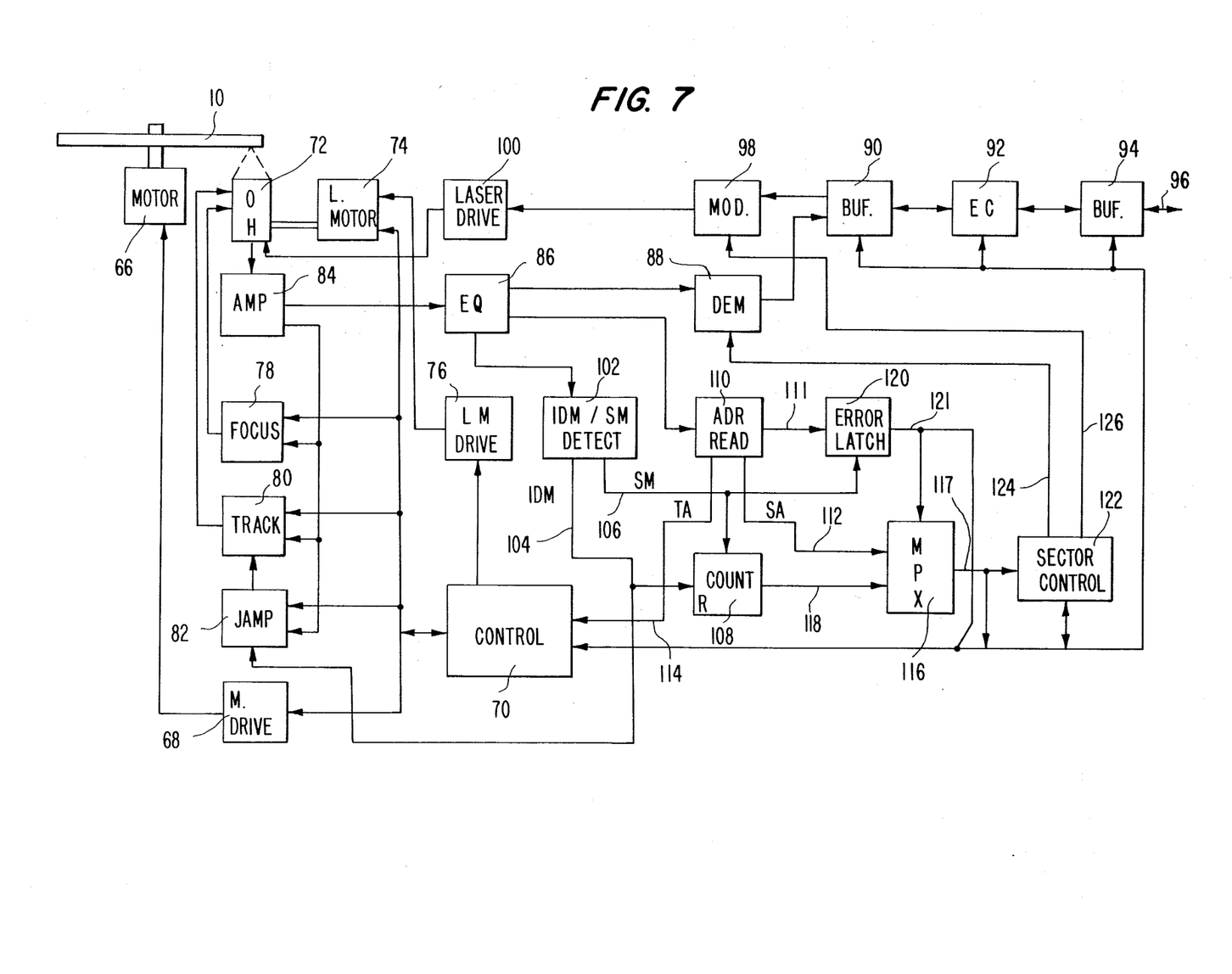
FIG. 7 is a block diagram of an optical recording and reading apparatus that is used with the optical disk according to the invention.

An example of optical recording and reading apparatus for recording or reading data on the optical disk according to the present invention is now described by referring to FIG. 7, where the optical disk 10 is rotated by an electric motor 66, which is driven by a driver circuit 68 under the control of a control unit 70. Data is recorded or read on the disk 10 by an optical head 72 that is moved along the face of the disk 10 by a linear motor 74. This motor 74 is driven by a linear motor driver circuit 76 under the control of the control unit 70. The optical head 72 is so controlled by a focus servo circuit 78 that the light beam emitted by the head 72 is focused onto the disk 10. The optical head 72 is also controlled by a tracking servo circuit 80 such that the light beam from the head correctly traces the guide track on the disk 10. During jumping operation, a jumping circuit 82 is operated to cause the optical head 72 to repeatedly trace an identical turn of the track on the disk 10. The focus servo circuit 78, the tracking servo circuit 80, and the jumping circuit 82 are also controlled by the control unit 70. The electrical signal produced by the optical head is supplied via a head amplifier 84 and an equalizer 86 to a demodulator circuit 88, where the signal is demodulated. The demodulated signal is then delivered as an output data 96 after passing through a scramble buffer 90, an error correcting circuit 92, and a data buffer 94. An input data 96 is applied to the data buffer 94, and then it is furnished via the error correcting circuit 92 and the scramble buffer 90 to a modulator circuit 98, where the signal is modulated. The modulated signal is then fed to a laser driver circuit 100 to control the light beam emitted from the optical head 72 during recording.

The signal delivered from the equalizer 86 is applied to an index mark/sector mark detecting circuit 102, which produces an index mark signal 104 and a sector mark signal 106. The index mark signal 104 is supplied to a counter 108 as a reset signal, and it is also given to the jumping circuit 82 as a trigger signal. The sector mark signal 106 is applied to the counter 108, where it is counted.

The signal delivered from the equalizer 86 is also impressed on an address reading circuit 110, which produces a sector address signal 112 and a track address signal 114. The track address signal 114 is provided to the control unit 70, while the sector address signal 112 is applied to a multiplexer circuit 116 that also receives the output 118 from the counter 108. The multiplexer circuit 116 is so designed that if an address error detecting circuit 120 delivers an error signal 121, the output 118 from the counter 108 is allowed to be applied to a sector control circuit 122, and that if the detecting circuit 120 does not, the sector address signal 112 is permitted to be applied to the sector control circuit 122. The address error detecting circuit 120 is connected to the address reading circuit 110, and acts to sense whether errors have taken place in reading addresses. The sector control circuit 122 applies a read sector gate signal 124 to the demodulator circuit 88 during reading, and it supplies a write sector gate signal 126 to the modulator circuit 98 during recording, for controlling the reading and writing operations.

The operation of the optical recording and reading apparatus constructed as described above is now described. The focused thin beam from the optical head 72 is directed to the optical disk 10 that is rotated at a given frequency by the motor 66. The light beam is caused to trace the guide track under the control of the focus servo circuit 78 and the tracking servo circuit 80. Since the guide track is spiral in shape, the optical head 72 moves along track, under this condition, in such a way that the track is always placed just above the head 72 under the control of the linear motor 74 and the linear motor driver circuit 76.

Each time the optical disk 10 makes one revolution, the optical head 72 is caused to jump back to its original position by the action of the jumping circuit 82 so that the head 72 may trace the same turn of the track.

The index mark 22 recorded on the disk 10 is detected by the index mark/sector mark detecting circuit 102, which produces the index mark signal 104 and the sector mark signal 106. The index mark signal 104 is applied to the jumping circuit 82. While the light beam is moving across the jumping region 24 of the optical disk 10, the focus lens of the head 72 is slightly moved radially by the actuator just when the jumping circuit 82 receives the index mark signal 104, to cause the head to jump back to its original position on the track. The control unit 70 that is formed by a microcomputer receives and reads the track address output 114 from the address reading circuit 110 and the error signal 121 to see if the correct jumping operation has been performed. In particular, each track address 44 on the disk 10 has the same number of items as the number of sectors per turn of the track, the items being equal in contents. The control unit 70 reads those address fields from which no error is detected and confirms their correctness to see if the jumping operation has been correctly done. This attains reliable retrace of the spiral track.

Data is recorded on the optical disk in the manner described below. First, the optical head 72 is rapidly conveyed to a designated turn of the guide track by the linear motor 74. Then, the input data 96 is transferred from a system to the data buffer 94, after which an error correction code is added to the data by the error correcting circuit 92. The data is then stored in the scramble buffer 90, which serves to interleave the data recorded on the optical disk 10 for rendering burst errors occurring on the disk random.

The sector control circuit 122 detects the specified sector position lying in the turn of the track. When the head 72 begins to trace the specified sector, the write sector gate signal 126 is produced to operate the modulator circuit 98. Then, the signal from the scramble buffer 90 is subjected to digital modulation by the modulator circuit 98. The digitized signal is applied to the laser driver circuit 100 to drive a semiconductor laser incorporated in the optical head 72. Thus, the light beam of a minute diameter is amplitude-modulated to record the data on the disk 10.

The data is read out in the manner described below. The read selector gate signal 124 from the sector control circuit 122 is applied to the demodulator circuit 88, which then begins to demodulate the signal that is supplied to it after the waveform is modified by the equalizer 86. The demodulated signal is then held in the scramble buffer 90, from which data is delivered in such a way that the data is de-interleaved. Errors are detected and corrected by the error detecting circuit 92. Then, the data is held in the data buffer 94 which delivers its output as the output data 96 to the system.

As thus far described, recording or reading of data is made as a unit of sector, and therefore the detection of the sector addresses is of great importance, requiring high reliability. Further, the number of the sectors not detected must be reduced to a minimum.

As well known in the prior art, the bit error rate is of the order of $10^{-4}$ to $10^{-5}$. On the other hand, the error rate occurring in reading the address fields 28 is of the order of $10^{-3}$ to $10^{-4}$, which is worse than the bit error rate by a factor of ten or more. Hence, an error recovery function is necessitated. Each address field 28 stores short items of information, i.e., tens of bits, so long items of data cannot be interleaved. Optical disks often produce burst errors of the order of tens of microns to hundreds of microns (corresponding to tens of bits to hundreds of bits). For these and other reasons, appropriate error correction cannot be readily made.

The device according to the present invention produces a substitutive sector address using the sector mark 26 recorded in the front part of the address field 28 of each sector header region 34 and uses the substitutive sector address in place of an address erroneously read from the address field, in order to recover the error. Thus, sector addresses are read quite reliably. This operation is next described.

The substitutive sector address counter 108 has a clock input to which the sector mark signal 106 is applied. The index mark signal 104 is applied to the counter as a load input. The counter begins to count the sector marks 26 after being triggered by the index mark 22. The output 118 from the counter is applied to the multiplexer 116 together with the sector address signal 112 from the address reading circuit 110. One of the two inputs to the multiplexer 116 is allowed to appear at its output by the output signal 121 from the error latch 120 which retains and delivers the error signal 111 indicating the errors when the address fields 28 are incorrectly read. When the output signal 121 from the error latch 120 is switched on, the output 118 from the counter is delivered as sector address data 117 to both the sector control circuit 122 and the control unit 70. When the signal 121 is switched off, the sector address signal 112 is delivered as the sector address data 117 to them. The error latch 120 is set by the read error signal 111 and reset by the sector mark signal 106. Accordingly, a failure to detect a sector takes place only in the event both the address field 28 and the sector mark 26 are faulty. Such a case arises much less frequently than the case where only the address field is faulty. As thus far described, the novel apparatus permits reliable retrace of the spiral track and reliable detection of sectors, leaving only a low rate of sectors not detected.

Before recording data, the control unit 70 adds the same address data as the addresses (track address and sector address) in the object sector to the user data stored in the data buffer 94. Then, the data is written onto the object sector via the error correcting circuit 92, the scramble buffer 90, and the modulator circuit 98. This writing of data is allowed only when no error is detected in reading the address field in the object sector. That is, during the writing operation, the control unit 70 functions in such a way that if the address field 28 in the object sector is incorrectly read, the read error is not recovered through the use of a substitutive sector address which is produced by the counter 108 using the sector mark 26.

When the data is read, if the address field in the object sector is incorrectly read due to deterioration of the optical disk or adhesion of dust to it, the output signal obtained by counting the aforementioned sector mark is used in alternative manner, and then the signal resulting from the data field in the sector having the identical sector address is demodulated. Subsequently, the resulting signal is de-interleaved by the scramble buffer 90, after which the errors are corrected by the error correcting circuit 92. Thereafter, the data is stored in the data buffer 94. The control unit 70 takes the address data from the data buffer 94 and checks to see if it is the correct sector. If it is the correct one, the control unit 70 instructs the data buffer 94 to send out the user data.

According to the procedure described above, data is recorded in address fields free of error. If errors occur later about address fields, they are accurately recovered by the use of both sector marks and the address data read from the data fields. Consequently, data can be read quite reliably.

While specific embodiments of the invention have been illustrated and described herein, it is to be understood that other modifications and changes will occur to those skilled in the art. It is therefore to be understood that the appended claims are intended to cover all modifications and changes as fall within the true spirit and scope of the invention.

What is claimed is:

1. An optical recording disc having a spiral guide track, said optical recording disc comprising:
   an index field formed on the disc and including a first discrimination portion as a sole means for generating a jump starting signal and a jumping region circumferentially following said first discrimination portion and within which an optical head is able to perform a jumping operation; and
   a plurality of sectors each of which includes a sector header region which has a second discrimination portion formed at the head of the sector and an address field which follows the second discrimination portion, and a data field succeeding the sector header region and used for recording data;
   each of said first and second discrimination portions comprising a set of similar segments, each of which is constituted by a combination of marks and grooves.

2. An optical recording and reproducing apparatus for recording and reading data on an optical recording medium that comprises a spiral track, an index field, and a plurality of sectors, the index field being composed of a first discrimination portion and a jumping region for allowing an optical head to perform a jumping operation, each of the sectors being composed of a sector header region and a data field formed next to the sector header region and used for recording data, the sector header region being formed by a second discrimination portion formed at the head of an address field and an address field containing at least a track address and a sector address, the address field being formed following the second discrimination portion, said apparatus comprising:
   a jumping means for detecting the first discrimination portion and causing the optical head to perform a jumping operation in the jumping region;
   a means for detecting the second discrimination portion;
   a counter means which acts to count a signal detected from the second discrimination portions and which is initialized by a signal produced upon detection of the first discrimination portion;
   a means for reading the address fields a means for detecting errors produced in reading the address fields;
   a gate means for selectively delivering either a signal indicating the sector address or an output from the counter, the gate means being so designed that it allows the counter output to be delivered as a substitute sector address upon application of an output signal from the detecting means corresponding to reading errors; and
   a recording and reproducing means for recording and reproducing data.

3. The optical recording and reproducing apparatus of claim 2 further comprising means for supplying to said gate means the output from the counter in place of the sector address of an address field which has been incorrectly read only during a reproducing operation and for not supplying the output from the counter during a recording operation.

4. The optical recording and reproducing apparatus of claim 2 wherein said gate means comprises means for using the track addresses contained in the address fields of one turn of the track which do not cause read error as correct track addresses.

5. The optical recording and reproducing apparatus of claim 2 further comprising means for adding the address data of a desired sector into the user data to be recorded in that sector, whereby the appended address data is recorded with the user data in the desired sector.

6. The optical recording and reproducing apparatus of claim 5 further comprising means for, during reproducing of data, reading the address data added to the user data and identifying the address data as being for the desired sector and, when the address data has been so identified, outputting the user data.

* * * * *